United States Patent Office 3,677,725
Patented July 18, 1972

3,677,725
LIQUID HYDROCARBON COMPOSITIONS
CONTAINING ANTISTATIC AGENTS
Harry J. Andress, Jr., Pitman, N.J., assignor to
Mobil Oil Corporation
No Drawing. Filed Feb. 4, 1970, Ser. No. 8,702
Int. Cl. C10l 1/18, 1/22
U.S. Cl. 44—62                           6 Claims

ABSTRACT OF THE DISCLOSURE

Compositions are provided containing, in an amount sufficient to impart antistatic properties, copolymers of maleic anhydride and a 1-olefin or an alkylvinylether or their alkyl esters, carboxymethyl esters or carboxymethyl amides.

BACKGROUND OF THE INVENTION

(1) Field of the invention

This invention relates to compositions having desirable antistatic properties, and, in one of its aspects, relates more particularly to liquid compositions in the form of volatile organic liquids such as hydrocarbon fuels, solvents, ink oils, lubricants or paints which possess low electrical conductivity, and which, when they accumulate electrostatic charges, may give rise to the hazard of ignition or explosion. More particularly in this aspect, the invention relates to the improvement of such compositions by incorporating therein additives which are effective in increasing the electrical conductivity of such liquids to the extent that accumulation of electrostatic charges, with attendant danger of ignition or explosion, is significantly minimized, particularly in the handling, transportation or treatment of such liquids.

(2) Description of the prior art

Prior to the present invention, the low electrical conductivity of many volatile organic liquid compositions has presented the problem of controlling static buildup, particularly during handling and transportation, for the purpose of insuring safe and effective distribution without the concomitant danger of ignition or explosion. For example, volatile organic liquids such as hydrocarbon fuels (e.g. gasoline, jet fuels, turbine fuels and the like), or light hydrocarbon oils employed for such purposes as solvents or cleaning fluids for textiles, possess a very low degree of electrical conductivity. In the use of such fluids, electrostatic charges, which may be generated by handling, operation or other means, tend to form on the surface, and may result in sparks, thus resulting in ignition or explosion. These hazards may be encountered merely in the handling or transportation of such organic liquids and even in operations, such as centrifuging in which a solid is separated from a volatile liquid, during which electrostatic charges can accumulate.

Various materials have heretofore been proposed for incorporation into such organic liquid compositions for increasing their electrical conductivity and thus reduce the aforementioned dangers of ignition and explosion. Such materials, however, have not been proved to be sufficiently effective in increasing the desired electrical conductivity of these fluids and, in many instances, have been found to be too costly for the relatively small degree of increased protection which they are capable of providing.

SUMMARY OF THE INVENTION

In accordance with the present invention, improved compositions are provided containing, in an amount sufficient to impart antistatic properties, a copolymer selected from the group consisting of (1) maleic anhydride and a 1-olefin or an alkylvinylether and (2) the alkyl esters, carboxymethyl amides or carboxymethyl esters of the aforementioned copolymers. The incorporation of these antistatic agents in the aforementioned compositions, imparts increased electrical conductivity to an extent greater than that which has heretofore been realized with many other antistatic materials.

In general, the present invention, in its preferred applications, contemplates liquid compositions which normally are capable of accumulating a relatively large degree of electrostatic charge resulting in the aforementioned hazards of ignition and explosion, having incorporated therein a small amount of the aforementioned copolymeric materials, usually from about 0.001 to about 200 and preferably from about 1 to about 10 pounds per thousand barrels of the total volume of the liquid composition.

A field of specific applicability of the present invention is the improvement of organic liquid compositions in the form of petroleum distillate fuels having an initial boiling point from about 75° F. to about 135° F. and an end boiling point from about 250° F. to about 750° F. It should be noted, in this respect, that the term "distillate fuels" is not intended to be restricted to straight-run distillate fractions. These distillate fuel oils can be straight-run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well-known commercial methods, such as acid or caustic treatment, hydrogenation, solvent refining, clay treatment, and the like.

The distillate fuel oils are characterized by their relatively low viscosity, pour point and the like. The principal property which characterizes these contemplated hydrocarbons, however, is their distillation range. As hereinbefore indicated, this range will lie between about 75° F. and about 750° F. Obviously, the distillation range of each individual fuel will cover a narrower boiling range, falling nevertheless, within the above-specified limits. Likewise, each fuel will boil substantially, continuously, throughout its distillation range.

Particularly contemplated among the fuel oils are Nos. 1, 2 and 3 fuel oils, used in heating and as Diesel fuel oils, gasoline, turbine fuels and the jet combustion fuels, as previously indicated. The domestic fuel oils generally conform to the specifications set forth in ASTM Specification D396-48T. Specifications for Diesel fuels are defined in ASTM Specification D975-48T. Typical jet fuels are defined in Military Specification MIL-F-5624B.

Other fields of specific applicability of the present invention are: solvents, as used with paints; spot removers such as naphtha cleaners; textile compositions; pigments; liquid polishes; rubber compositions and the like. In brief, the antistatic agents of this invention can be used with a composition susceptible of accumulating a static electrical charge or a composition susceptible of generating such a charge. Thus, a static electrical charge accumulated by such a composition can be reduced by coating a surface of the composition with one or more of the novel antistatic agents. For example, a fabric or fibre can be surface treated with one or more of the agents to reduce the susceptibility of the fabric or fibre to accumulate a static electrical charge.

As hereinbefore indicated, the antistatic agents of the present invention comprise copolymers selected from the group consisting of (1) maleic anhydride and a 1-olefin or alkylvinylether and (2) the alkyl esters, carboxymethyl amides or carboxy methyl esters of these copolymers. Exemplary of such antistatic agents are copolymers of 1-octadecene-maleic anhydride, 1-octadecene-maleic acid, carboxymethyl amide of 1-octadecene-maleic anhydride, carboxymethyl ester of 1-octadecene-maleic anhydride, copolymers of maleic anhydride and 1-olefins having from about 22 to about 28 carbon atoms, copolymers of maleic anhydride and 1-olefins having at least 30 carbon atoms, diisodecylesters of 1-octadecene-maleic anhydride copolymers, 2-methylpentyl ester of 1-octadecene-maleic anhydride copolymer, copolymers of n-hexadecylvinylether and maleic anhydride, copolymers of isooctylvinylether and maleic anhydride, copolymers of dodecylvinylether and maleic anhydride and copolymers of octadecylvinylether and maleic anhydride. It will be understood, of course, that other copolymers of the aforementioned representative types may also be successfully incorporated into the novel compositions of the present invention for their beneficial antistatic effect.

DESCRIPTION OF SPECIFIC EMBODIMENTS

The following examples will serve to illustrate the preparation of the novel antistatic agents of the present invention and the effect thereof when these agents are present in various forms of compositions for the purpose of effectively imparting antistatic thereto, and particularly with respect to liquid hydrocarbon fuels.

EXAMPLE 1

A mixture of 252 grams (1 mol 1-octadecene, 98 grams (1 mol) maleic anhydride, i.e. a mol ratio of 1:1, and 7.0 grams of ditertiary butyl peroxide was stirred at 150° C. for about four hours to form the final product, viz a 1-octadecene-maleic anhydride copolymer.

EXAMPLE 2

A mixture of 200 grams of the copolymer of Example 1, 200 grams of xylene and 100 grams of distilled water was stirred at 90° C. for about four hours. Removal of the water produced the final product, viz a 1-octadecene-maleic acid copolymer.

EXAMPLE 3

A mixture of 175 grams (0.5 mol) of 1-octadecene-maleic anhydride copolymer, 37.5 grams (0.5 mol) glycine, i.e. a mol ratio of 1:1, and 175 grams xylene was stirred at 136° C. for about three hours to form the final product, viz a carboxymethyl amide of 1-octadecene-maleic anhydride copolymer.

EXAMPLE 4

A mixture of 116.7 grams (⅓ mol) of a $C_{22}$–$C_{28}$ 1-olefin mixture, 32.7 grams (⅓ mol) of maleic anhydride, i.e. a mol ratio of 1:1, and 7.5 grams ditertiarybutyl peroxide was stirred at 150° C. for about 12 hours to form the final product, viz a $C_{22}$–$C_{28}$ 1-olefin-maleic anhydride copolymer.

EXAMPLE 5

A mixture of 315 grams (0.75 mol) of a $C_{30}$ and higher 1-olefin mixture, 73.5 grams (0.75 mol) maleic anhydride, i.e. a mol ratio of 1:1, and 27 grams of ditertiarybutyl peroxide was stirred at 150° C. for about 24 hours to form the final product, viz a $C_{30}$ and higher 1-olefin-maleic anhydride copolymer.

EXAMPLE 6

A mixture of 123 grams (0.35 mol) of 1-octadecene-maleic anhydride copolymer, 100 grams (0.7 mol) of isodecanol, i.e. a mol ratio of 1:2, and 100 grams of xylene was refluxed at a temperature of 190° C. for about two hours to form the final product, viz a diisodecylester of 1-octadecene-maleic anhydride copolymer.

EXAMPLE 7

A mixture of 185 grams (0.54 mol) of 1-octadecene-maleic anhydride copolymer, 32 grams (0.27 mol) of 2-methylpentanediol 2,4, i.e. a mol ratio of 2:1, and 150 grams xylene was stirred at 125° C. for five hours to form the final product, viz a 2-methylpentylester of 1-octadecene-maleic anhydride copolymer.

EXAMPLE 8

A mixture of 190 grams (0.71 mol) of n-hexadecylvinylether, 70 grams (0.71 mol) of maleic anhydride, i.e. a mol ratio of 1:1, 260 grams of xylene and 5 grams of ditertiarybutyl peroxide was stirred for four hours at 145° C. to form the final product, viz an n-hexadecylvinylether-maleic anhydride copolymer.

EXAMPLE 9

A mixture of 156 grams (1 mol) of isooctylvinylether and 98 grams (1 mol) of maleic anhydride, i.e. a mol ratio of 1:1, was stirred at about 180° C. for about two hour to form the final product, viz n-dodecylvinylether-maleic anhydride copolymer.

EXAMPLE 10

A mixture of 176 grams (0.83 mol) of n-dodecylvinylether and 81 grams (0.83 mol) of maleic anhydride, i.e. a mol ratio of 1:1, was stirred at about 180° C. for about one hour to form the final product, viz n-dodecylvinylether-maleic anhydride copolymer.

EXAMPLE 11

A mixture of 180 grams (0.61 mol) of n-octadecylvinylether and 60 grams (0.61 mol) of maleic anhydride, i.e. a mol ratio of 1:1, was stirred at about 165° C. for about two hours to form the final product, viz an n-octadecylvinylether-maleic anhydride copolymer.

EXAMPLE 12

A mixture of 175 grams (0.5 mol) of 1-octadecene-maleic anhydride copolymer, 38 grams (0.5 mol) of hydroxy acetic acid, i.e. a mol ratio of 1:1, and 175 grams xylene was stirred at 136° C. for about three hours to form the final product, viz a carboxymethyl ester of 1-octadecene-maleic anhydride copolymer.

In accordance with the data of the following table a series of comparative electrical conductivity tests were carried out for the purpose of determining the aforementioned properties of the compositions prepared in accordance with Examples 1 through 12 with respect to imparting antistatic properties to oganic liquid compositions. The test employed for this purpose was electrical conductivity measured in picomhos (i.e. $10^{-12}$ mhos) per meter. In these tests the aforementioned antistatic agents were blended in a liquid hydrocarbon fuel composition comprising about 75% catalytically cracked component and about 25% straightrun componentt, boiling at a temperature from about 320°–720° F. The resulting fuel compositions were then evaluated for their degree of improvement in electrical conductivity, with the results shown in the table.

TABLE

| Composition | Anti-static agent | Concentration, lbs./ 1,000 bbls. | Conductivity picomhos/ meter |
|---|---|---|---|
| Uninhibited fuel oil | | 0 | 1.6 |
| | + Example 1 | 5 | 551 |
| | + Example 2 | 5 | 544 |
| | + Example 3 | 5 | 532 |
| | + Example 4 | 5 | 496 |
| | + Example 5 | 5 | 355 |
| | + Example 6 | 5 | 77 |
| | + Example 7 | 5 | 254 |
| | + Example 8 | 5 | 1,640 |
| | + Example 9 | 5 | 160 |
| | + Example 10 | 5 | 378 |
| | + Example 11 | 5 | 236 |
| | + Example 12 | 5 | 242 |

As will be seen from the data of the examples of the foregoing table, a marked improvement in antistatic properties of organic liquid compositions is obtained through the use of the antistatic additives of the present invention. It will be understood, of course, that the improved organic liquid compositions of the present invention may, if so desired, contain various other additives or mixtures of such additional additives in order to further enhance their properties. Thus, the organic liquid compositions of the present invention may also contain such additives as antioxidants, detergents, dispersants, stability improvers and the like. It will also be understood that although the present invention has been described with preferred embodiments, various modifications and adaptations thereof may be resorted to without departing from the spirit and scope of the invention, as those skilled in the art will readily understand.

I claim:

1. A liquid hydrocarbon composition, falling within the range selected from the group consisting of gasoline, cleaning fluid and fuel oil, and susceptible of accumulating static electrical charge, containing in an amount sufficient to impart antistatic properties, an additive selected from the group consisting of alkyl esters, carboxymethyl esters and carboxymethyl amides of the copolymers of maleic anhydride and a 1-olefin having at least 30 carbon atoms or an alkylvinylether, said copolymer having been prepared by reacting maleic anhydride and a 1-olefin or an alkyl-vinylether in a mol ratio of 1:1.

2. The composition of claim 1 wherein said additive is present in an amount from about 0.001 to about 200 pounds per thousand barrels of said composition.

3. The composition of claim 1 wherein said additive is present in an amount from about 1 to about 10 pounds per thousand barrels of said composition.

4. The composition of claim 1 wherein said composition comprises a petroleum distillate fuel oil having an initial boiling point from about 75° F. to about 135° F. and an end boiling point from about 250° F. to about 750° F.

5. The composition of claim 1 wherein said composition comprises a jet fuel.

6. The composition of claim 1 wherein said composition comprises a turbine fuel.

References Cited

UNITED STATES PATENTS

| | | | |
|---|---|---|---|
| 2,542,542 | 2/1951 | Lippincott et al. | 252—56 D |
| 2,543,964 | 3/1951 | Giammaria | 252—56 |
| 2,615,845 | 10/1952 | Lippincott et al. | 44—62 X |
| 2,677,662 | 5/1954 | Mikeska et al. | 252—56 D |
| 2,694,685 | 11/1954 | Bartlett | 252—56 D |
| 2,977,334 | 3/1961 | Zopf et al. | 252—56 X |
| 2,978,395 | 4/1961 | Hollyday et al. | 44—62 X |
| 3,010,810 | 11/1961 | Stayner et al. | 44—62 |
| 3,574,575 | 4/1971 | Gee et al. | 44—62 |
| 3,578,421 | 5/1971 | Andress et al. | 44—62 |

FOREIGN PATENTS

| | | | |
|---|---|---|---|
| 6603483 | 9/1967 | Netherlands | 44—62 |

DANIEL E. WYMAN, Primary Examiner

W. J. SHINE, Assistant Examiner

U.S. Cl. X.R.

44—63, 70, 71; 252—8.6, 170, 171

PO-1050
(5/69)

UNITED STATES PATENT OFFICE
CERTIFICATE OF CORRECTION

Patent No. 3,677,725            Dated July 18, 1972

Inventor(s) HARRY J. ANDRESS, JR.

It is certified that error appears in the above-identified patent and that said Letters Patent are hereby corrected as shown below:

Column 4, line 16 "hour" should read --hours--

Column 4, line 16 "n-dodecylvinylether" should read --the isooctylvinylether of--

Column 4, line 44 "oganic" should read --organic--

Column 4, line 49 "componentt" should read --component--

Signed and sealed this 6th day of March 1973.

(SEAL)
Attest:

EDWARD M. FLETCHER, JR.           ROBERT GOTTSCHALK
Attesting Officer                     Commissioner of Patents